April 20, 1937.    G. S. PIPER    2,077,852
COMBINATION OF WINDOW SHADE AND OPERATING MEANS
Filed Jan. 14, 1936
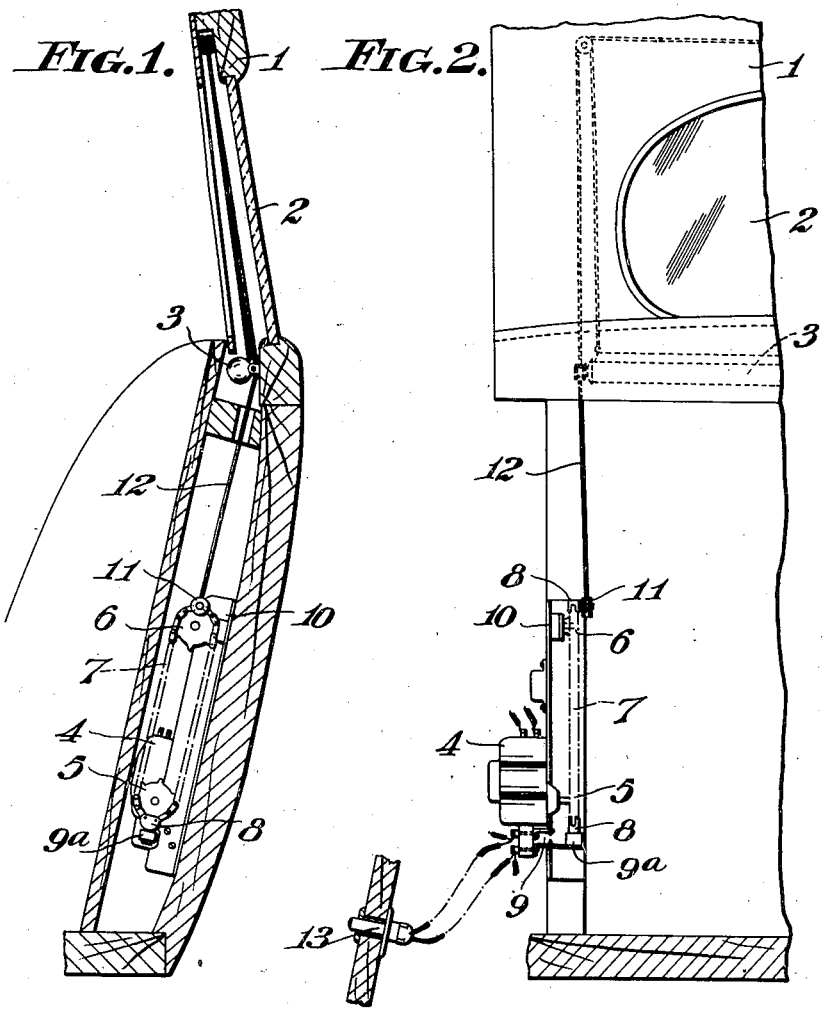
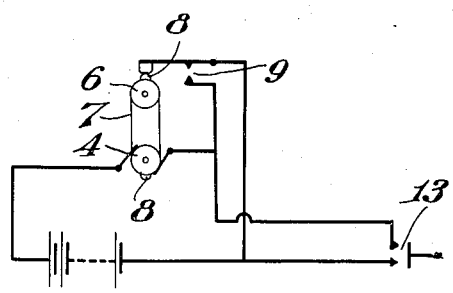
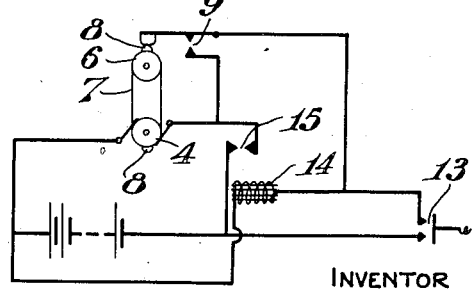
INVENTOR
GEORGE STEPHEN PIPER
BY Benj. T. King.
ATTORNEY Patented Apr. 20, 1937

2,077,852

UNITED STATES PATENT OFFICE 2,077,852

COMBINATION OF WINDOW SHADE AND OPERATING MEANS

George Stephen Piper, London, England

Application January 14, 1936, Serial No. 59,135
In Great Britain January 31, 1935

2 Claims. (Cl. 156—28)

This invention relates to improvements in the controlling (i. e. the raising or lowering) of window shades or closures and is particularly applicable to the controlling of the rear window shade or closure of a motor road vehicle. Usually, the rear window shades or closures of such vehicles are spring urged to either a raised or lowered normal position and are controlled by means of a cord passing on the inside of the body to a point in convenient reach of the driver of the vehicle to be pulled to actuate the shade or closure to its reverse position, the release of the cord permitting the spring to act to return the shade or closure to its normal raised or lowered position as the case may be.

It is the object of the present invention to provide a controlling mechanism of simple construction with a minimum of moving parts which is unlikely to fail and which can be produced cheaply.

A further object is to provide a mechanism which can be fitted quickly to a vehicle at any desired or convenient point.

Another object of the invention is to provide a means for operating the window shade or closure, of a motor road vehicle from the driver's seat in a simple manner and to insure that the driver's control over the vehicle is interfered with as little as possible.

The invention may be applied to all classes of window shades or closures which are extended or retracted by a spring or the like and it provides a means for raising or lowering a single or several blinds at the same time by one operation.

In order that a clear understanding of the invention may be obtained, reference will now be made by way of example to the accompanying sheet of drawing, in which:—

Fig. 1 is a transverse sectional view through the rear panel of an automobile body showing a preferred form of the invention.

Fig. 2 is a front view thereof.

Fig. 3 is a diagram of one circuit arrangement and

Fig. 4 is a diagram of an alternative circuit arrangement.

In the drawing the parts numbered 1 represent the conventional bodywork of a motor vehicle, 2 the window and 3 a window wound on a spring return roller. 4, designates an electric motor of a suitable type to be operated by the car battery, and 5 designates a sprocket wheel driven thereby. A second sprocket 6 is provided, an endless chain 7 being engaged on said sprockets. Mounted on said chain at opposite points are two projections 8, and in the path thereof beneath motor, sprocket chain and pair of contacts is will be observed that the assembly comprising the motor, sprocket chain and pair of contacts is mounted on a bracket member 10 forming a unitary assembly which may be conveniently fixed to the rear frame upright. A member 11 is also provided on the chain and has secured thereto the shade cord 12, the member 11 being adjacent the one of the two projections 8. An operating switch 13 is provided which is conveniently mounted on the dashboard to be operated by the driver.

In operation and referring particularly to Fig. 3 when it is desired to raise the shade from the lowered position, the dashboard switch 13 is depressed and the circuit is completed through the motor. When the chain moves, the lower projection 8 disengages from the co-operating member 9a of the contacts and permits them to close. From Fig. 3 it will be observed that the motor will continue to turn because the contacts 9 are closed, and the circuit to the motor is completed thereby, until such time as the other projection 8 breaks the contact 9. During this movement, the member 11 is moved from above the top sprocket to beneath the bottom sprocket, thereby pulling the cord 12 and raising the shade. The contacts 9 will be broken but the motor will be re-energized and said contacts re-established if the switch 13 again is operated. This will permit lowering of the shade and the same will be drawn onto its spring tensioned roller.

In the control arrangement illustrated in Fig. 4 a relay is employed comprising an electromagnet 14 having a pair of contacts 15 which are closed when the relay operates. It will be observed that when the switch 13 is momentarily depressed the relay is energized thus closing the contacts 15. This causes the motor to operate and the contacts 9 to close, the closing of these latter, which are in series with the contacts 15, keeping the relay energized. As soon as the contacts 9 are opened by the following projection 8, the circuit to the relay is broken and the motor stops. The relay contacts 15 also open.

It will be observed that it is only necessary to depress the operating switch momentarily for the blind to be raised or lowered, the motor stopping immediately the operation is performed.

As previously indicated, invention obviously is not limited to the control of window shades for motor vehicles, but may be used for the control of various other closures or shades or their equivalents which are spring urged to a raised or lowered positon. Accordingly, the term "shade" as used in the claims is to be construed to mean either an actual shade, or a closure or any equivalent of either.

I claim,

1. A window shade operating means comprising, in combination, a window shade which is spring urged in one direction, a unidirectional electric motor, an endless band connected with and driven by said motor and connected with the shade, mounting means for said endless band, a switch the contacts whereof are normally closed positioned adjacent said band and located in the circuit of said motor, two projections on said band spaced apart along the length thereof each adapted to engage with and open said switch contacts, responsive to a predetermined amount of travel of said band, and a manually operable switch located in the circuit of said motor for closing said circuit momentarily when the contacts of the first mentioned switch are open.

2. A controlling means as set forth in claim 1 in which the endless band, the motor and the switch contacts are mounted in unitary assembly on a supporting base.

GEORGE STEPHEN PIPER.